Patented May 6, 1930

1,757,500

UNITED STATES PATENT OFFICE

JAMES BADDILEY, OF BLACKLEY, MANCHESTER, ENGLAND, ASSIGNOR TO BRITISH DYESTUFFS CORPORATION LIMITED, OF BLACKLEY, MANCHESTER, ENGLAND

RELATING TO MANUFACTURE OF NEW SECONDARY DISAZO DYES FROM 1:8-AMINO-NAPHTHOL SULPHONIC ACID

No Drawing. Application filed May 21, 1927, Serial No. 193,387, and in Great Britain December 10, 1926. Renewed December 16, 1929.

This invention relates to the manufacture of new secondary disazo dyes by combining the diazo compound of a para nitro arylamine containing at least one solubilizing acidic substituent, such as a sulphonic or carboxylic group, including a derivative thereof in this term, with any usual middle component, rediazotizing and combining with a 1:8 amino naphthol sulphonic acid, including N-substitution products of the same in this term. These new secondary disazo dyes may be represented by the general formula

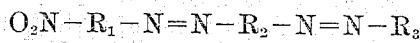

wherein $R_1$ represents a divalent aryl residue containing at least one solubilizing acidic group, $R_2$ represents a divalent aryl residue and $R_3$ represents a coupled 1:8 amino naphthol sulphonic acid and in which the nitro group is attached to $R_1$ in para position to the azo group. These dyestuffs are not well suited for the commercial dyeing of cotton for while they do possess a certain affinity for cotton the affinity is of an inferior degree making the dyes, in view of the present state of the art, of little or no industrial interest as cotton dyes. On the other hand, I have discovered that in spite of this slight affinity for cotton there is inherent in these dyes a very valuable affinity for regenerated cellulose. It is well known that in the application of ordinary blue cotton dyes to regenerated cellulose in the form of artificial silk there is great difficulty, amounting at times to impossibility, in obtaining level shades. The affinity of my new dyestuffs obtained according to this invention and which, as stated, yield blue shades, is of a nature differing from that of ordinary cotton dyes and is such that dyeings of a very superior degree of levelness and evenness may be produced. It is believed that in the present invention, an important advance in the production of dyes suitable for dyeing regenerated cellulose has been made.

Further, the nitro groups in these colours may be reduced by means of suitable agents, such as sodium sulphide; the resulting dyestuffs may be dyed on the regenerated cellulose fibre, and if desired may be diazotized on the fibre and developed with the usual developers.

The following example illustrates our invention without limiting it, the parts being by weight:

218 parts of para nitro aniline-o-sulphonic acid are diazotized in the normal way and a solution of 137 parts of meta-amino-para-cresol-methyl ether dissolved in an equivalent amount of hydrochloric acid is run into it. Complete combination takes place in the mineral acid medium during six hours. The monoazo colour is taken into solution in caustic soda at 35° C., 69 parts of sodium nitrite are added and the mixture is then run into hydrochloric acid. The temperature is maintained at about 35° C. for three hours, at the end of which time diazotization is complete. The mixture is then run slowly into an alkaline solution of 239 parts of 1:8-amino-naphthol-4-sulphonic acid and combination takes place rapidly, the mixture being maintained alkaline throughout. The dyestuff is precipitated by addition of salt, filtered and dried. It dyes viscose silk a bright blue shade. The dyestuff in the form of its sodium salt has the probable formula

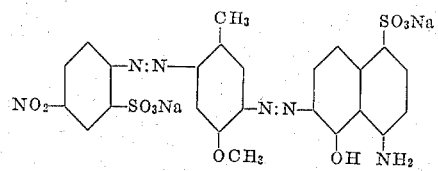

and in the dry condition is a bronze-black powder, soluble in water to a blue solution which becomes redder on addition of mineral acid and greener on addition of dilute caustic soda, dissolving in concentrated sulphuric acid to a bluish-green solution which deposits a violet precipitate on dilution with water.

Other examples illustrating my generic invention are quoted in the following table:—

| Secondary disazo colour from: | | End component | Shade on viscose silk |
|---|---|---|---|
| First component | Middle component | | |
| para-nitroaniline-o-sulphonic acid | Meta-amino-p-cresol methyl ether | 1-acetyl amino-8-naphthol-3:6-disulphonic acid | Reddish-blue |
| Do | do | 1:8-amino naphthol - 3:6 - disulphonic acid | Greenish-blue. |
| Do | do | 1:8-amino naphthol - 2:4 - disulphonic acid | Blue. |
| para-nitroaniline-o-sulphonic acid | Meta-toluidine | 1:8-amino naphthol-4-sulphonic acid | Blue |
| para-nitroaniline-o-sulphonic acid | Para-xylidene | 1:8-amino naphthol-4-sulphonic acid | Dull blue |
| para-nitroaniline-o-sulphonic acid | Cleves acid | 1:8-amino naphthol-4-sulphonic acid | Blue |
| 5-nitro-2-amino benzoic acid | Meta-amino-p-cresol methyl ether | 1:8-amino naphthol-4-sulphonic acid | Blue |
| 2:4-dinitroaniline-6-sulphonic acid | do | do | Blue |
| para-nitroaniline-o-sulphonic acid | do | 1:8-amino naphthol-3:6-disulphonic acid | Blue-black |
| | | The nitro group being subsequently reduced after coupling. | |
| Do | do | 1:8-amino naphthol-4-sulphonic acid | Greenish-blue |
| | | The nitro group being subsequently reduced after coupling. | | and $R_3$ represents a coupled 1:8 amino naphthol sulphonic acid and in which the nitro group is attached to $R_1$ in para position to the azo group, the said dyestuffs dyeing regenerated cellulose materials in even level shades.

What I claim and desire to secure by Letters Patent is:—

1. The process for the manufacture of new secondary disazo dyes which comprises coupling the diazo compound of a p-nitro aryl amine containing at least one solubilizing acidic group with a primary aryl amine which is capable of being diazotized after being coupled, rediazotizing and coupling with a 1:8-amino naphthol sulphonic acid.

2. The process for the manufacture of new secondary disazo dyes which comprises coupling the diazo compound of p-nitro aryl amine-sulphonic acid with a primary aryl amine which is capable of being diazotized after being coupled, radiazotizing and coupling with a 1:8-amino naphthol sulphonic acid.

3. The process for the manufacture of new secondary disazo dyes which comprises coupling the diazo compound of p-nitro aniline-o-sulphonic acid with a primary aryl amine which is capable of being diazotized after being coupled, rediazotizing and coupling with a 1:8-amino naphthol sulphonic acid.

4. The process for the manufacture of new secondary disazo dyes which comprises coupling the diazo compound of p-nitro aryl amine sulphonic acid with m-amino-p-cresol methyl ether, rediazotizing and coupling with a 1:8-amino-naphthol sulphonic acid.

5. The process for the manufacture of new secondary disazo dyes which comprises coupling the diazo compound of a p-nitro aniline-sulphonic acid with m-amino-p-cresol-methyl-ether, rediazotizing and combining in an alkaline medium with 1-amino-8-naphthol-4-sulphonic acid.

6. New secondary disazo dyestuffs having the general formula $$O_2N-R_1-N=N-R_2-N=N-R_3$$

wherein $R_1$ represents a divalent aryl residue containing at least one solubilizing acidic group, $R_2$ represents a divalent aryl residue and $R_3$ represents a coupled 1:8 amino naphthol sulphonic acid and in which the nitro group is attached to $R_1$ in para position to the azo group, the said dyestuffs dyeing regenerated cellulose materials in even level shades.

7. New secondary disazo dyestuffs having the general formula $$O_2N-R_4-N=N-R_2-N=N-R_3$$

wherein $R_4$ represents a divalent aryl residue containing a sulphonic acid group, $R_2$ represents a divalent aryl residue and $R_3$ represents a coupled 1:8 amino naphthol sulphonic acid and in which the nitro group is attached to $R_4$ in para position to the azo group, the said dyestuffs dyeing regenerated cellulose materials in even level shades.

8. New secondary disazo dyestuffs having the general formula

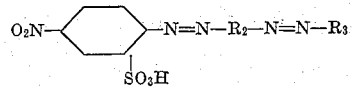

wherein $R_2$ represents a divalent aryl residue and $R_3$ represents a coupled 1:8 amino naphthol sulphonic acid, the said dyestuffs dyeing regenerated cellulose in even level shades.

9. New secondary disazo dyestuffs having the general formula

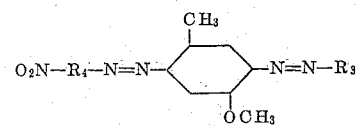

wherein $R_4$ represents a divalent aryl residue containing a sulphonic acid group and $R_3$ represents a coupled 1:8 amino naphthol sulphonic acid and in which the nitro group is attached to $R_4$ in para position to the azo group, the said dyestuffs dyeing regenerated cellulose in even level shades.

10. New secondary disazo dyestuffs having the general formula

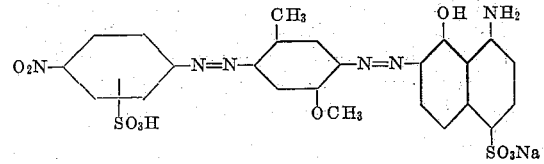

the said dyestuffs dyeing regenerated cellulose in even level shades.

11. The new secondary disazo dyestuff having in the form of its sodium salt the probable formula

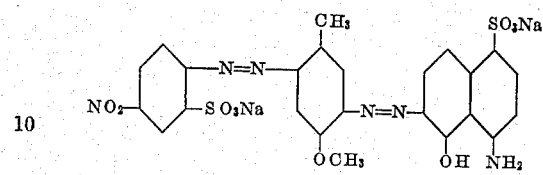

the said dyestuff being a bronze-black powder, soluble in water to a blue solution which becomes redder on addition of mineral acid and greener on addition of dilute caustic soda, dissolving in concentrated sulphuric acid to a bluish green solution which deposits a violet precipitate on dilution with water.

In testimony whereof I have signed my name to this specification.

JAMES BADDILEY.